(12) United States Patent
Meyer (10) Patent No.: US 6,746,636 B2
(45) Date of Patent: Jun. 8, 2004

(54) SPHEROIDAL SLAG AND FLY ASH PARTICLES AND APPARATUS AND PROCESS FOR PRODUCING SAME

(75) Inventor: Paul W. Meyer, Woodbury, MN (US)

(73) Assignee: Black Diamond Granules, Woodbury, MN (US)

( * ) Notice: Subject to any disclaimer, the term of this patent is extended or adjusted under 35 U.S.C. 154(b) by 272 days.

(21) Appl. No.: 09/870,055

(22) Filed: May 30, 2001

(65) Prior Publication Data
US 2002/0025436 A1 Feb. 28, 2002

Related U.S. Application Data

(62) Division of application No. 09/016,707, filed on Jan. 30, 1998, now Pat. No. 6,258,456.

(51) Int. Cl.⁷ .................................................. B29C 9/16
(52) U.S. Cl. ........................................................ 264/15
(58) Field of Search ............................................ 264/15

(56) References Cited

U.S. PATENT DOCUMENTS

| | | |
|---|---|---|
| 2,038,251 A | 4/1936 | Vogt |
| 2,044,680 A | 6/1936 | Gilbert |
| 2,619,776 A | 3/1952 | Potters |
| 2,859,560 A | 11/1958 | Wald, Jr. et al. |
| 2,947,115 A | 8/1960 | Wood |
| 3,171,714 A * | 3/1965 | Jones et al. .................. 264/0.5 |
| 4,017,290 A * | 4/1977 | Budrick et al. ............... 65/21.4 |
| 4,113,915 A | 9/1978 | Schott ......................... 428/402 |
| 4,153,655 A | 5/1979 | Minnick et al. ................ 264/8 |
| 4,259,271 A | 3/1981 | Minnick et al. ................ 264/8 |
| 4,268,320 A | 5/1981 | Klingaman et al. ..... 106/288 B |
| 4,294,750 A | 10/1981 | Klingaman et al. ........ 260/40 R |
| 4,475,936 A | 10/1984 | Aston et al. ................... 65/142 |
| 4,487,620 A | 12/1984 | Neusy ........................ 65/21.3 |
| 4,698,289 A | 10/1987 | Aldrich et al. .......... 430/106.16 |
| 4,751,202 A | 6/1988 | Toussaint et al. .............. 507/33 |
| 4,808,217 A * | 2/1989 | Kopatz et al. ................. 75/342 |
| 4,894,081 A | 1/1990 | Neusy .......................... 65/21.3 |
| 4,904,292 A | 2/1990 | Neusy .......................... 65/21.3 |

(List continued on next page.)

FOREIGN PATENT DOCUMENTS

GB          2 176 774 A      1/1987

OTHER PUBLICATIONS

Hnat, James G. et al., "Coal–Fired Vitrification Process for Recycling of Utility Fly Ash" Ninth International Ash Use Symposium, American Coal Ash Association, 91–74, 1991, pp. 143.

Humphreys, K. et al., "Coal Ash Usage: Producing Mineral Wool From By–Products", *Minerals Processing*, pp. 16–21 (Mar. 1970).

Manz, O., "Utilization of By–Products From Western Coal Combustion in the Manufacture of Mineral Wool and Other Ceramic Materials", *Cement and Concrete Research*, vol. 14, No. 4, pp. 513–520 (1984).

*Primary Examiner*—Mary Lynn Theisen
(74) *Attorney, Agent, or Firm*—Merchant & Gould P.C.

(57) ABSTRACT

The present invention provides spheroidal particles of coal slag, and methods of making the spheroidal particles. One method of the invention includes delivering a feedstock of irregularly shaped particles of coal fly ash or coal slag to a drop tube, dropping the irregularly shaped particles into the drop tube in a manner such that the irregularly shaped particles flow in a substantially vertical downward path as individualized particles, and heating the irregularly shaped particles to cause at least the outer surface of the irregularly shaped particles to melt and form spheroidal particles due to surface tension at the outer surface. The spheroidal particles typically have a diameter in the range of about 0.001 to 5 mm, and comprise $SiO_2$, $Al_2O_3$, $Fe_2O_3$, FeO, $Na_2O$, and $K_2O$.

21 Claims, 5 Drawing Sheets

U.S. PATENT DOCUMENTS

| | | | |
|---|---|---|---|
| 4,961,770 A | 10/1990 | Johnson et al. | 65/21.3 |
| 4,966,617 A | 10/1990 | Neusy | 65/21.3 |
| 5,108,461 A | 4/1992 | Ruthner | 23/313 R |
| 5,253,991 A | 10/1993 | Yokota et al. | 264/15 |
| 5,611,833 A | 3/1997 | Brahmbhatt et al. | 264/15 |
| 5,641,717 A | 6/1997 | Castle | 501/33 |
| 6,258,456 B1 | 7/2001 | Meyer | 428/402 |

* cited by examiner

SPHEROIDAL SLAG AND FLY ASH PARTICLES AND APPARATUS AND PROCESS FOR PRODUCING SAME

This is a divisional application of U.S. patent application Ser. No. 09/016,707, filed Jan. 30, 1998, now U.S. Pat. No. 6,258,456.

FIELD OF THE INVENTION

The present invention relates to a process for spherulizing slag and agglomerated fly ash particles, particularly slag and agglomerated fly ash particles resulting from coal-fired generators, an apparatus suitable for carrying out the process, and the spheroidal particles so produced.

BACKGROUND OF THE INVENTION

Each year many tons of materials such as slag and fly ash resulting from combustion of coal in boilers, hereinafter referred to as coal slag and coal fly ash, found in electric generating plants are produced. In the United States in 1993, for example, over 5.6 million metric tons of coal slag and 43.7 million metric tons of coal fly ash were produced as coal combustion byproducts. The greatest use of such materials is found in roofing granules and as sandblasting materials. Other uses are found in cement and concrete products, snow and ice control, and grouting materials. However, only about 55% of the coal slag and only about 22% of the coal fly ash is incorporated into useful products. The remaining amount is generally disposed of in landfills.

The need to provide additional useful products from such materials and thereby alleviate disposal of these materials in waste storage landfills has long been felt. Forming coal slag or coal fly ash into useful products is considered to be a significant improvement over disposing of such materials in such landfills.

A method for manufacturing rounded vitreous beads is known wherein a feed means which can include a reservoir adapted to hold a fluidized bed of feedstock particles and having at least one overflow under gravity. For manufacture of solid beads, crushed glass cutlet is the recommended feedstock; for cellular beads, a pelletized feedstock containing glass formers and cellulating agent is recommended. The feedstock is delivered to the upper end of a chamber which includes a pair of opposed walls which are spaced apart by a distance less than their breadth, e.g., 15–30 cm, and which are angled to the horizontal so that the feedstock can pass through the chamber under gravity.

In this method, a means for heating the chamber is arranged to heat at least one wall of the pair of opposed walls so that feedstock passing between the pair of opposed walls is heated by radiant heat. The chamber can have segments of increased spacing between the opposed walls from the top of the chamber to the bottom of the chamber as well as differing temperatures in different zones downward through the chamber. For some feedstock compositions, it is desirable to allow the particles to expand while subjected to a temperature in the range of 400° C. to 500° C., to heat the particles to 800° C. to 900° C. for spherulization, and to heat them to about 1200° C. for partial devitrification.

A process has also been disclosed for producing ceramic powders based on single-or multi-phase metal oxides, including $SiO_2$ compounds, exhibiting a narrow particle size distribution. The raw feed material exhibits a specific surface area of 0.05 up to 500 $m^2/g$ and is treated in an indirectly heated drop tube furnace in the form of classified granules exhibiting an average diameter of 10 up to 2500 $\mu m$ for a period of 0.5 up to 15 seconds at a temperature of 500° K. up to 3500° K. The raw feed material flows freely into the furnace via a charging device and drops by action of gravity, in a quasi free-falling manner, through the furnace atmosphere, which is oxidizing, inert or reducing, and is cooled. The cooled-off discharged reaction sintered agglomerates are collected and deagglomerated into primary particles by means of an ultrasonic milling device, a sand milt or a jet mill to produce ceramic powder.

Spheroidal particulate material, such as spheroidal cement or smelter slag can be produced by subjecting the particles to a high temperature flame treatment and rapidly cooling them in air. A retention furnace for retaining a molten liquid inorganic material and a nozzle assembly communicated to the retention furnace and capable of scattering therethrough the molten liquid inorganic material are provided. A jet gas entrains the molten inorganic material introduced in the nozzle assembly and scatters the molten inorganic material to cool it. Gas spray means for spraying the jet gas are also provided.

SUMMARY OF THE INVENTION

The present invention, in one aspect, provides spheroidal particles of coal slag and coal fly ash. The spheroidal particles have at least a hard outer shell, a diameter preferably in the range of about 0.001 to 5 mm, more preferably in the range of about 0.1 to 1 mm, and comprise $SiO_2$, $Al_2O_3$, $Fe_2O_3$, FeO, CaO, $K_2O$, and $Na_2O$. Components can also include other oxides such as, for example, oxides of heavy metals, and other materials.

The spheroidal particles of coal slag of this invention have high hardness due to the relatively high amounts of $Al_2O_3$. This high hardness allows the spheroidal particles to be used, for example, as shot-peening media. The spheroidal shape of the coal slag particles provides low interparticle friction and a low angle of repose, which enables the particles to be used, for example, as fillers for lubricants or plastic resins, or as flowable construction fill. The spheroidal fly ash particles are resistant to leaching of constituent oxides by water due to the reduction in porosity and surface area that occurs on spherulization. These spheroidal fly ash particles are also resistant to hydrolysis due to the relatively low proportions of alkali metals, i.e., $Na_2O$ and $K_2O$, and relatively high proportions of CaO and $Al_2O_3$, in the particles. This also provides resistance to leaching of constituent oxides by water.

The present invention, in another aspect, provides a process for spheruling irregularly shaped particles of coal slag or agglomerated coal fly ash, resulting from coal combustion. The process includes the steps of:

(a) providing a drop tube having an upper portion, a central portion and a lower portion;

(b) delivering a feedstock of irregularly shaped particles of coal slag or coal fly ash to the upper portion of the drop tube in a manner such that the particles flow in a substantially vertical downward path through the feed tube as individualized particles;

(c) heating the particles to a sufficient temperature by providing heat to the outer surface of the central portion of the drop tube to cause at least the outer surface of the particles to melt such that a majority, i.e, at least about 50 weight percent, of the particles become spheroidal due to surface tension at the outer surface; and (d) cooling the particles, preferably in the lower portion of the drop tube, to prevent agglomeration.

The coal slag or agglomerated coal fly ash feedstock, which can range in size from, for example, about 0.001 to 10 mm, preferably from about 0.1 to 1 mm, can be delivered through a feed tube having a small discharge port, having one or more holes, each with a diameter from, for example, at least the maximum particle diameter of the feedstock to at most one-half the diameter of the drop tube, and more preferably, from one to ten times the maximum particle diameter of the feedstock, at the lower end thereof.

The present invention, in a further aspect, provides an apparatus for spherulizing particles comprising (a) a substantially vertical elongate drop tube;
(b) a feed tube extending into the upper terminal portion of the drop tube and having a substantially closed lower terminal portion with a discharge port therein, the vertical axis of the discharge port being substantially on the vertical axis of the drop tube;
(c) feed means for supplying a feedstock to the feed tube;
(d) vibrating means for intermittently rapping the feed tube to cause discharge of the feedstock from the feed tube in a substantially vertical downward path through the drop tube as individualized particles;
(e) heating means proximate the outer portion of the drop tube and proximate a central portion of the drop tube, the heating means being capable of providing sufficient heat within the drop tube to cause the viscosity of at least the outer portion of the particles to become sufficiently low to allow the surface tension of the particles to spherulize the particles;
(f) cooling means to effect cooling of the spherulized particles such that the particles do not adhere to each other; and
(g) means for collecting the spherulized particles.

The apparatus of the invention is particularly useful with particles having irregular shapes such as, for example, coal slag or agglomerated coal fly ash. The vibrating means can be provided by a magnet and coil, the coil being intermittently powered to cause the magnet to rap the feed tube, or by a solenoid. The feedstock can be provided to the feed tube, for example, by gravity means. The heat can be provided, for example, by a radiant heater, by an electric heating element or gas fired or particle burning heating elements encircling the drop tube, by convection heat such as provided by, for example, direct flame or preheated air, or by induction or dielectric heating of the drop tube and/or the feedstock. A fan can be provided adjacent the lower end of the drop tube, if necessary, to provide suction pressure to overcome any chimney effect caused by heating the central portion of the drop tube.

The present invention, in another aspect, provides a feed system for feeding irregularly shaped particles comprising:

(a) a feed tube oriented substantially vertically and having a substantially closed lower terminal portion with a discharge port therein;
(b) feed means for supplying a feedstock of irregularly shaped particles to the feed tube; and
(c) vibrating means for intermittently rapping the feed tube to cause discharge of the feedstock from the feed tube in a substantially vertical downward path as individualized particles.

The present invention, in another aspect, provides a process for feeding irregularly shaped particles comprising:

(a) feeding irregularly shaped particles to a feed tube oriented substantially vertically and having a substantially closed lower terminal portion with a discharge port substantially centered on the vertical axis of the feed tube;
(b) intermittently rapping the feed tube to cause the particles to discharge from the feed tube in a substantially vertical downward path and at a rate at which the particles remain individualized.

DETAILED DESCRIPTION OF THE INVENTION

Figure 1:
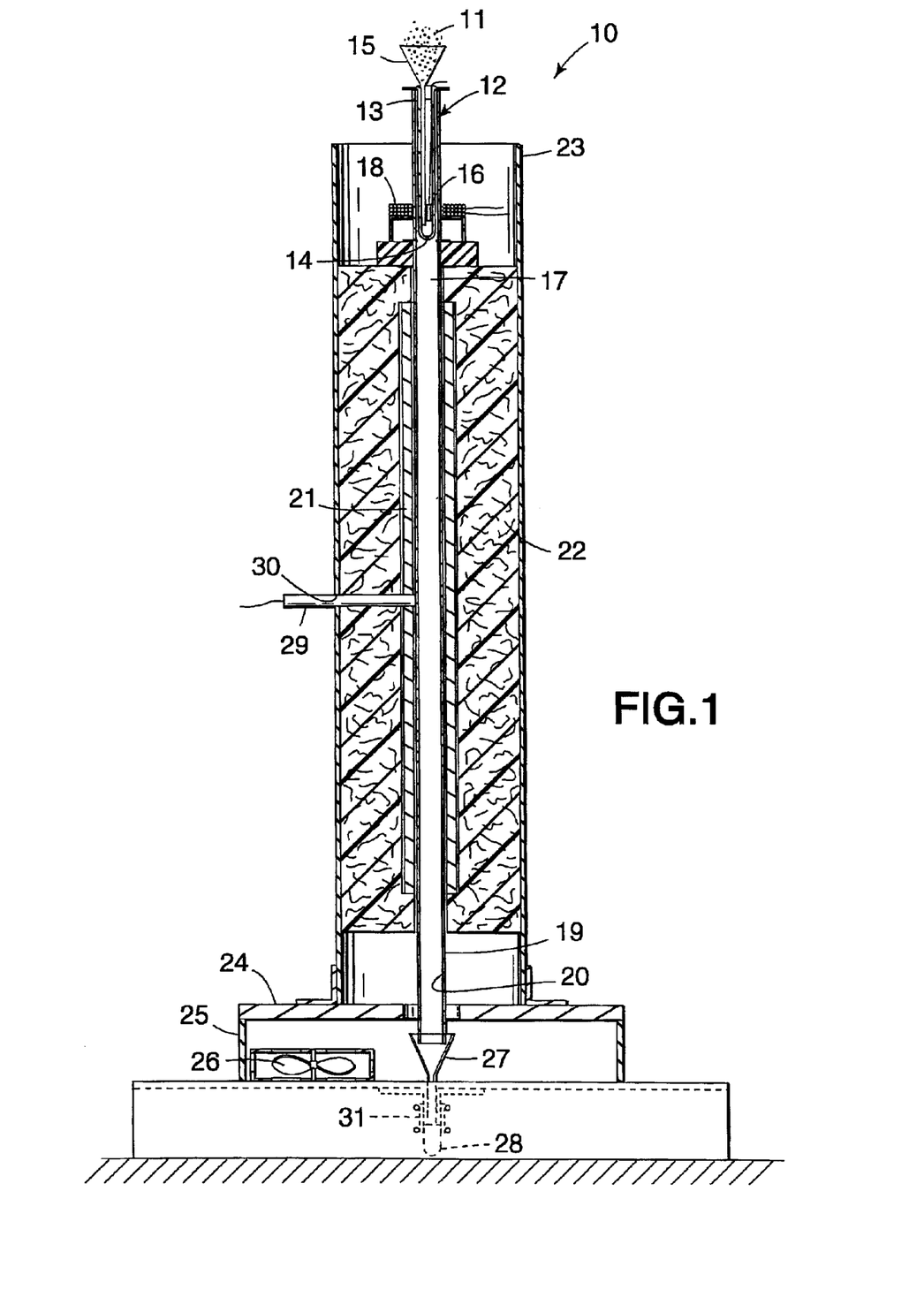
FIG. 1 is a cross-sectional side view of an apparatus useful in the process of the present invention.

FIG. 1 shows apparatus 10 useful in the present invention. Feedstock 11 which comprises irregularly shaped particles of coal slag or agglomerated coal fly ash delivered by means of delivery system 12 which includes feed tube 13 having a discharge port 14, at the bottom thereof. Feedstock can be fed into feed tube 13 by use of a gravity feed utilizing, for example, funnel 15 as shown.

Feed tube 13 can be formed from various materials including, but not limited to, ceramics such as, for example, borosilicate glass, quartz, silicon carbide or alumina, or refractory metals such as, for example, Inconel 600 or platinum. Feed tube 13 can also be formed from or lined with materials exhibiting low adhesion and/or low coefficient of friction with the feedstock at elevated temperatures, e.g., in the range of about 500° C. to 1000° C. or more, including, but not limited to, refractory ceramics such as, for example, chrome oxide, zirconium oxide, refractory metals such as, for example, platinum or platinum-gold alloy, or refractory materials requiring non-oxidizing atmospheres, such as, for example graphite or boron nitride.

Discharge of feedstock 11 from feed tube 13 can be accomplished, for example, by gravity; intermittent vibration; mechanical scraping, such as a rotary or reciprocating paddle or a feed screw; or air or mechanical fluidization with either overflow or underflow, all of which are well-known to those skilled in the art.

In FIG. 1, intermittent vibratory means are provided. Magnet 16 is positioned adjacent an inner portion of feed tube 13. As can be seen, feed tube 13 is positioned within an upper portion of drop tube 17 and coil 18, which is connected to a power supply (not shown), is positioned outwardly of drop tube 17. The power supply intermittently supplies power to coil 18 such that magnet 16 intermittently jars the tube sufficiently, the frequency and force dependent on the particle size, to encourage flow of feedstock 11 through discharge port 14 without blockage thereof.

Discharge port 14 can have, for example, a regular cross-section, such as circular or polygonal, or an elongate cross-section, such as an ellipse or a rectangular slot, or an array of holes, e.g., in a circular pattern. Discharge port 14 can also have, for example, a topology such as an annular slot, i.e., a ring, or an open circle or other various open shapes. Discharge port 14 can also be a bare wire screen or a ceramic coated wire screen, to limit or provide a more uniform flow rate over the cross-section of discharge port 14. Delivery of feedstock 11 is preferably carried out at a rate such that the particles have minimal contact with each other as they flow down the drop tube and, thus, remain individualized without sticking to each other. The delivery of feedstock 11 is also such that substantially all of the particles reach the bottom of the drop tube. The spacing between the lower terminal portion of the funnel stem and the bottom of the feed tube is adjusted such that the depth of the feedstock at the bottom of the feed tube is preferably 1 to 100 particle diameters or more, and most preferably, 1 to 10 particle diameters.

Drop tube 17 is preferably circular in cross-section and can vary in inside diameter from, for example, about 0.01 to 10 meters. Drop tube 17 is preferably oriented substantially vertically and can have a height of from, for example, about 0.01 to 100 meters or more, more preferably about 1 to 50 meters, most preferably about 2 to 20 meters. Generally, the inner wall 20 of drop tube 17 is vertical, although wall 20 can be as much as about 10° inward in the downward direction and perform adequately. Preferably, any angle from the vertical is outward in the downward direction to minimize the rate of impact of particles on inner wall 20.

Drop tube 17 can be of various materials including, for example, ceramics such as fused quartz, aluminum oxide, or silicon carbide, iron-nickel-chromium alloys such as, for example, stainless steel type 304 or 330, Inconel™ 600, or Hastily C-276. The inner wall 20 of drop tube 17 can be coated, tiled, or lined with various materials to minimize adhesion between the particles and inner wall 20, and minimize corrosion of inner wall 20 by any liquid slag or fly ash which adheres to inner wall 20. Such coatings include, but are not limited to, chrome oxide, magnesium oxide, zirconium oxide; silicon nitride, silicon carbide, or mixtures thereof, or platinum-gold alloys; or, in non-oxidizing atmospheres graphite or boron nitride.

Drop tube 17 is preferably heated by radiant heat provided, for example, by electric heating element 21 as shown in FIG. 1 or, alternatively, by gas fired or particle burning heating elements encircling the drop tube. Other heat sources, such as, for example, convection heat such as provided by, for example, direct flame or preheated air, or induction or dielectric heating methods can be considered. Generally, the particles drop slowly through the heated zone, preferably having a residence time, for example, from about 0.001 to 100 seconds, more preferably of from about 0.1 to 10 seconds, the residence time required being roughly proportional to the particle diameter.

Preferably, heating element 21 extends along drop tube 17 from a position below discharge port 14 of feed tube 13 for a distance sufficient to heat the vitreous particles to a temperature at which at least the outer surface melts, and the viscosity is sufficiently low to allow the surface tension of the melt to spherulize the particles. For coal slag and coal fly ash particles, the outer surface melts at a temperature in the range of about 1000° C. to 1500° C., and the surface tension is about, for example, about 0.2 to 0.5 N/m. Preferably, the temperature at outer wall 19 of drop tube 17 is between about 1000° C. and 1700° C., more preferably between about 1200° C. to 1500° C., as measured by thermocouple 29 inserted through port 30. Heating element 21 does not extend to the lower end of drop tube 17, the unheated portion providing a cooling zone where the spherulized particles can cool to about 500° C. to 1000° C. at which temperature adhesion of the particles does not occur and the particles remain individualized.

Outer wall 19 of drop tube 17 and heating element 21 are preferably encased in insulation 22, at least in the heating zone thereof Insulation 22 can be, for example, ceramic fiber, hollow ceramic spheres, or refractory brick. Insulation 22 can comprise, for example, ceramic materials such as alumina-silica, alumina, zirconia, silica, magnesia, rock/mineral or glass; or carbon when an inert atmosphere is used; all of which are well-known in the art. Generally, the insulation can be, for example, about 0.05 to 2 meters in thickness with greater thicknesses typically being used with larger diameter drop tubes.

Insulation 22 is preferably encased in a protective structural shell 23 which aids in supporting the weight of the insulation. Shell 23 can comprise, for example, carbon steel, stainless steel, nickel/chromium alloy, titanium, aluminum, ceramic materials or high temperature-rated plastics. The thickness of the shell wall is not particularly critical, but should be sufficient, where used, to support the insulation, prevent airflow through the shell wall, and to protect the insulation and drop tube from inadvertent impact.

Shell 23 preferably rests on blower box cover 24 on blower box 25, Blower box cover 24 and blower box 25 are constructed to support structural shell 23, heating element 21, drop tube 17, the feed system and ancillary equipment. An optional exhaust fan 26 can be provided to overcome any chimney effect generated in drop tube 17 by heating element 21.

Within the blower box, means for catching the spherulized particles are provided, In FIG. 1, the catching means comprises funnel 27 beneath which sleeve 31 is press-fit into catch tube 28 to prevent air from leaking into the funnel stem. Other means for catching the spherulized particles such as, for example, fluidized beds, conveyor belts, and the like which are well-known in the art can also be used.

Adjuvants can be added to a coal fly ash feedstock or to a very fine, for example, less than about 0.1 mm in particle size, coal slag feedstock, to change the surface character of the spherulized particles. Such adjuvants are typically added as a fine powder, adhere to the feedstock particle surface or contact the particle surface while molten and, thus, become a part of the surface of the particle. Pigments can be added to change the surface color, such as titanium dioxide added to whiten the surface. Metals such as copper or aluminum can be added to make the particle surface conductive. Other metals such as silver or gold can be added to make the particle surface optically reflective or to enhance the aesthetic characteristics. Flow enhancers, for example, powdered graphite, talc or mica, can also be added to the feedstock.

Additives which can be combined with the fly ash feedstock or finely divided coal slag feedstock prior to agglomeration include materials which provide, for example, $Al_2O_3$ to provide added hardness, $B_2O_3$ to provide added stiffness, BaO or SrO to improve toughness, $Na_2O$ or $K_2O$ to lower the melting point, although an increase in leachability may also result, and $H_2O$, NO, $NO_2$, $SO_3$, or $CO_2$, to provide porous or hollow spheroids, or mixtures thereof.

The spherulized particles can be coated after cooling with such materials as, for example, pigments to alter color, metals to alter properties such as, for example, conductivity or reflectance, lubricants, and hydrophobic materials. Such coating materials can be coated on the spherulized particles in a fluidized bed with heat, by application including a bonding agent such as, for example, a resin bonding agent, or other coating means well-known to the art.

The spherulized particles of the invention have various chemical compositions depending on the source of the feedstock. For example, coal slag and coal fly ash generally has the following composition:

$SiO_2$, preferably in the range of about 20 to 60 weight percent, more preferably in the range of about 40 to 55 weight percent;

$Al_2O_3$, preferably in the range of about 10 to 35 weight percent, more preferably in the range of about 15 to 30 weight percent;

$Fe_2O_3$ and FeO, preferably in the range of about 5 to 35 weight percent, more preferably in the range of about 10 to 20 weight percent;

CaO, preferably in the range of about 1 to 20 weight;

$Na_2O$ and $K_2O$, preferably in the range of about 0.1 to 4 weight percent.

The spherulized particles of the invention can be used in various processes and products for which the irregularly shaped feedstock would be unsuitable. Such processes include, for example, shot-peening, polishing, sandblasting of soft materials or precision surfaces, and filtering. The spherulized particles can be used, for example, as fluidized heat transfer media, flowable construction fill, and plastic or lubricant filler, due to the high flowability, smooth surface and compact shape of the spheroidal particles. The spherulized coal slag particles can be crushed under pressures of; for example, at least about 700 MPa (100,000 psi) and used as roofing granules, abrasives, and the like.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

Referring to FIG. 1, a Kimax™ borosilicate glass funnel having about a 51 mm (2 in.) diameter top opening and about a 152 mm (6 in.) long stem with the inner diameter of the stem being about 2.5 mm (0.1 in.) was placed into a feed tube. The feed tube of Kimax™ borosilicate glass had an inner diameter of about 17 mm (0.67 in.) and was about 152 mm (6 in.) long and was supported by wires resting on the top edge of the drop tube. The bottom of the feed tube was slightly convex and had about a 1 mm (0.025 in.) discharge port in the center thereof. The stem of the funnel was flush with the inside wall of the feed tube. The feed tube was suspended in the upper portion of a drop tube which was of fused quartz and had an inside diameter of about 25 mm (1 in.), and outside diameter of about 29 mm (1.14 in.), and a length of about 0.97 m (38.25 in.).

A ferrite ceramic magnet with a diameter of about 12.7 mm and a thickness of about 4.8 mm was suspended by means of a nichrome wire inside the feed tube and about 25 mm (1.0 in.) above the discharge port. The magnet was wrapped in 2 layers of aluminum foil, about 25 $\mu$m thick, to prevent contamination of the feedstock with ferrite magnetic particles. Enameled copper wire having a total diameter of about 1.71 mm, the wire being about 1.63 mm in diameter (14 gauge) formed a wound coil. The coil had an inner diameter of about 44 mm, an outer diameter of about 88 mm, and a thickness of about 24 mm, with an inductance of about 2.2 mH and a series resistance of about 0.33 ohms, was connected to a 12 volt pulse generator through a 4 ohm 50 watt current-limiting resistor. The coil was placed surrounding the outer portion of the drop tube with the lower surface of the coil about 19 mm (0.75 in.) above the discharge port and intermittent current was supplied to the coil which caused the magnet to intermittently rap the feed tube to provide continuous discharge of the feedstock through the discharge port.

A 2040 watt heating element which was normally operated at about 900 to 1000 watts and which had an inner diameter of about 32 mm (1.26 in.), an outer diameter of about 52 mm (2.05 in.) and a length of about 0.6 m (24 in.) and was powered directly from an AC fine carrying about 200 V rms through a 25 amp solid-state relay, the duty cycle of which was controlled by an adjustable pulse generator, to obtain the required heater temperature. The top of the heating element was located about 23.5 cm (9.25 in.) below the top of the drop tube.

Insulation of vitreous aluminosilicate ceramic fiber, available from Thermcraft, Inc., which had at inner diameter of about 5.2 cm (2.05 in.), an outer diameter of about 19.1 cm (7.5 in.) and a length of about 71 cm (28 in.) was placed around the drop tube and heating element and extended downward from a position about 18.4 cm (7.25 in.) from the top of the drop tube.

An aluminum structural shell having a wall thickness of about 0.32 mm (0.0125 in.) surrounded the insulation and extended about 12.7 cm (5 in.) above the insulation and about 7.6 cm (3 in.) below the insulation. The aluminum shell rested on an about 30.5 cm (12 in.) square aluminum blower box cover which was about 2.9 mm (0.114 in.) thick. The blower box of about 0.79 mm (0.031 in.) thick aluminum was about 30.5 cm (12 in.) square and about 7.6 cm (3 in.) in height. The blower box cover had a circular opening about 5.1 cm (2 in.) in diameter, substantially centered in the top thereof, through which the drop tube extended. A Type FN12B3, 12 volt, 220 mA blower available from Comair-Rotron, was placed in the blower box proximate a port 7.9 cm (3.125 in.) square. The blower was rated to provide a static pressure of about 68 Pa (0.27 in $H_2O$) at zero flow and full power. A motor speed control reduced the motor power to provide a static pressure of about 1.5 Pa (0.006 in $H_2O$) at zero flow to oppose the chimney effect in the drop tube.

A Kimax™ borosilicate glass funnel having a mouth about 7.6 cm (3 in.) in diameter was located in the blower box such that the mouth of the funnel was about 1.25 cm (0.5 in.) below the blower box cover. The lower end of the drop tube was flush with the lower surface of the blower box cover. The stem of the funnel, about 1.28 cm (0.50 in.) inner diameter, about 1.69 cm (0.67 in.) outer diameter and about 3.5 cm (1.38 in.) long extended through an opening about 1.9 cm (0.75 in.) in diameter in the base of the blower box. A Kimax™ borosilicate glass catch tube having an outer diameter of about 2.5 cm (1 in.) and a length of about 5.0 cm (2 in.) was sealed onto the terminus of the funnel stem to collect the spherulized product.

At the midpoint of the heating element, a horizontal bore having a diameter of about 6.3 mm (0.25 in.) extended through the structural shell the insulation and the heating element. Into this bore was placed a closed-end mullite/glass tube having an inner diameter of about 4.5 mm (0.18 in.), and outer diameter of about 6.3 mm (0.25 in.), and a length of about 15 cm (6 in.) such that the closed end of the mullite/glass tube abutted the drop tube. A type K thermocouple fabricated from about 0.81 mm diameter (20 gauge) Chromel/Alumel™ wire was seated within the mullite/glass tube to measure the temperature at the midpoint of the heated portion of the drop tube.

Figure 4:
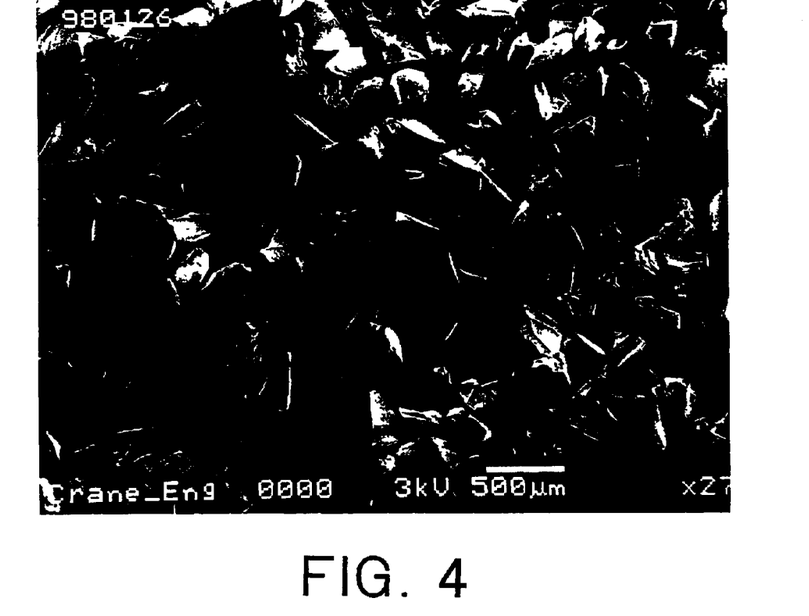
FIG. 4 is photomicrograph produced using a scanning electron microscope (SEM) of a coal slag feedstock used in Example 1 at a magnification of 27×.

The heating element was turned on and when the temperature of the drop tube, as measured by the thermocouple, reached about 1250° C., coal slag feedstock, such as that shown in FIG. 4, having a particle size of about 0.23 to 0.27 mm was fed through the funnel into the feed tube. The terminal portion of the funnel stem was at a height above the bottom of the feed tube such that the feedstock depth in the feed tube was maintained at about 1 mm. The feed tube was rapped an average of about 9 times per second by the magnet at a magnetic torque of roughly 0.001 Nm in 10 sec pulses causing the feedstock to enter the drop tube at a rate of about 2.4 mg/sec. The residence time of the particles in the feed tube was about 0.5 seconds.

The product which was spherulized in the heated portion of the drop tube was sufficiently cool when it was discharged from the drop tube that minimal sticking together of particles occurred. The product yield was about 83% of the mass of the particles fed into the drop tube.

Five spheroids were randomly chosen and tested for hardness using a Vickers Diamond Pyramid penetrator with a 50 g load. The hardness ranged from 478 HV to 551 HV, with an average of 503 HV. The bulk density of the spheroidal slag product was determined to be roughly 1.8 g/cm$^3$.

Figure 5:
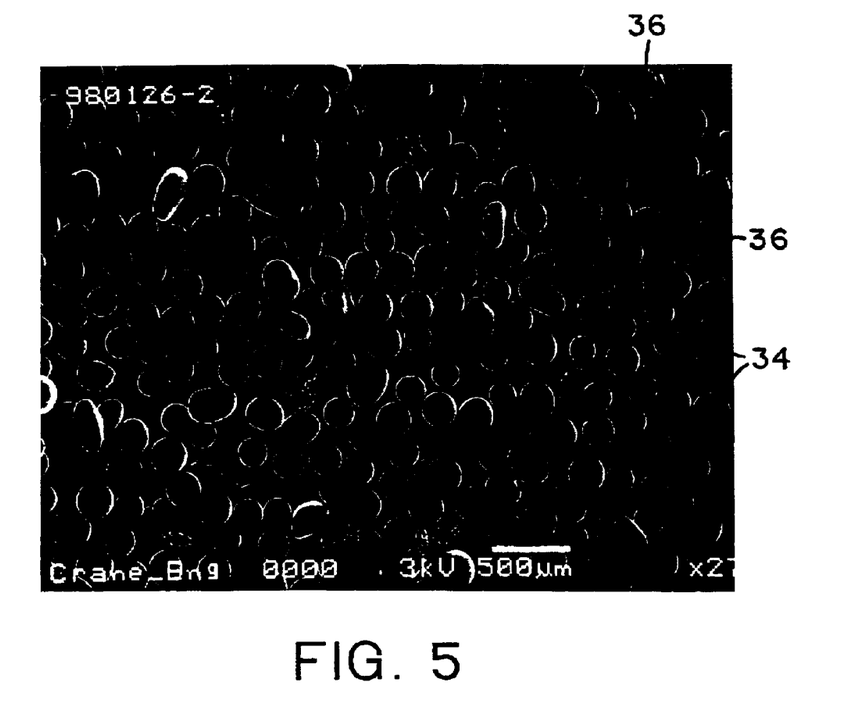
FIG. 5 is an SEM photomicrograph of a spheroidal coal slag product prepared in Example 1 at a magnification of 27×.

Up to about 30% of the product was in the form of duplex particles, at least about 70% of which readily disassociated in the course of normal handling. On inspection, about 90% of the irregularly shaped feedstock particles were spherulized. The spherulized coal slag product can be seen in FIG. 5. In FIG. 5 spherulized product 34 can be seen to be generally spheroidal, ranging from somewhat elongate to substantially spherical. Irregular particles 36 are suspected to be unburned coal or contaminant due to use of material other than coal in the combustion mix for the coal-fired boiler.

Example 2

Figure 6:
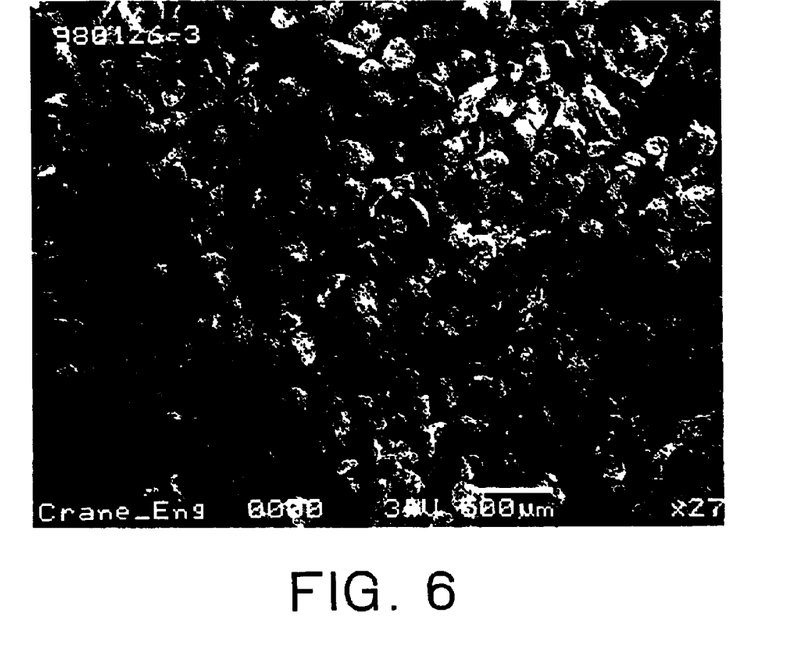
FIG. 6 is an SEM photomicrograph of a coal fly ash feedstock used in Example 2 at a magnification of 27×.

The same apparatus was used as described in Example 1. Coal fly ash was obtained from an electric power generating plant burning low-sulfur subbituminous coal known to form an ash having a high enough CaO content to self-cement. The fraction of as-received agglomerated granular feedstock that was about 0.16 to 0.23 mm in size, shown in FIG. 6, was oven dried for about 3.5 hours at about 265° C. The bulk density of this coal fly ash feedstock was determined to be roughly 0.6 g/cm$^3$. When the drop tube temperature reached about 1250° C. as determined by the thermocouple reading, the oven-dried agglomerated coal fly ash was fed through the funnel into the feed tube. The feed tube was rapped at an average rate of about 9 times per second by the magnet as in Example 1, causing the feedstock to enter the drop tube at a rate of about 0.35 mg/sec. Due to the smaller size and lower bulk density of the feedstock, the bulk density being about 35% that of coal slag feedstock, the feed rate was significantly less than in Example 1.

The product which was spherulized in the heated portion of the drop tube was sufficiently cool when it was discharged from the drop tube that no sticking together of particles occurred. On inspection, substantially all of the irregularly shaped coal slag feedstock particles were spherulized. The product yield was about 75% of the mass of the particles fed into the drop tube.

Spheroids were randomly chosen and tested for hardness using a Vickers Diamond Pyramid penetrator with a 50 g load. The hardness could not be determined due to the friability of the spheroidal particles. The bulk density of the spheroidal fly ash product was determined to be roughly 1.8 g/cm$^3$.

Figure 7:
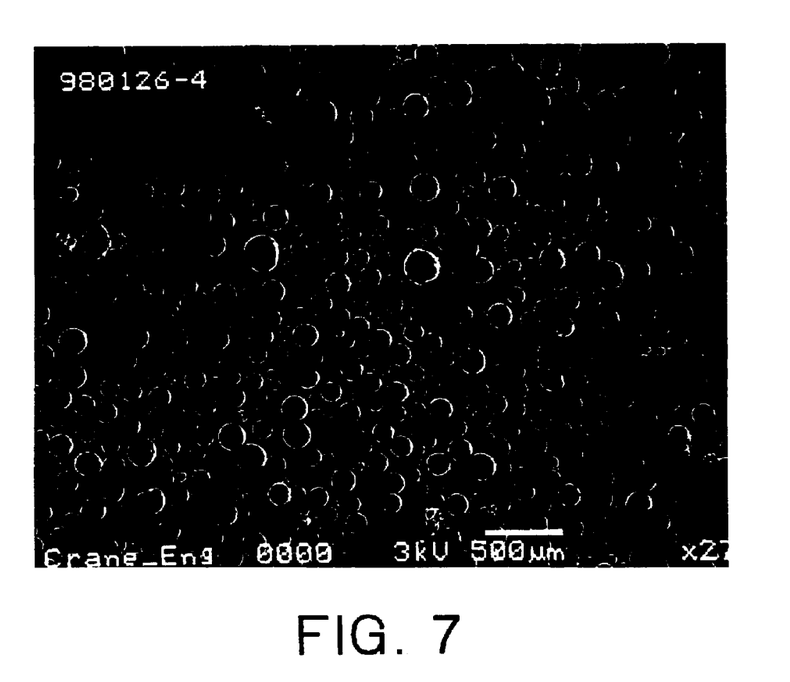
FIG. 7 is an SEM photomicrograph of a spheroidal coal fly ash product prepared in Example 2 at a magnification of 27×.

The spherulized coal slag product can be seen in FIG. 7. In FIG. 7, the product can be seen to be substantially spheroidal.

Example 3

Figure 2:
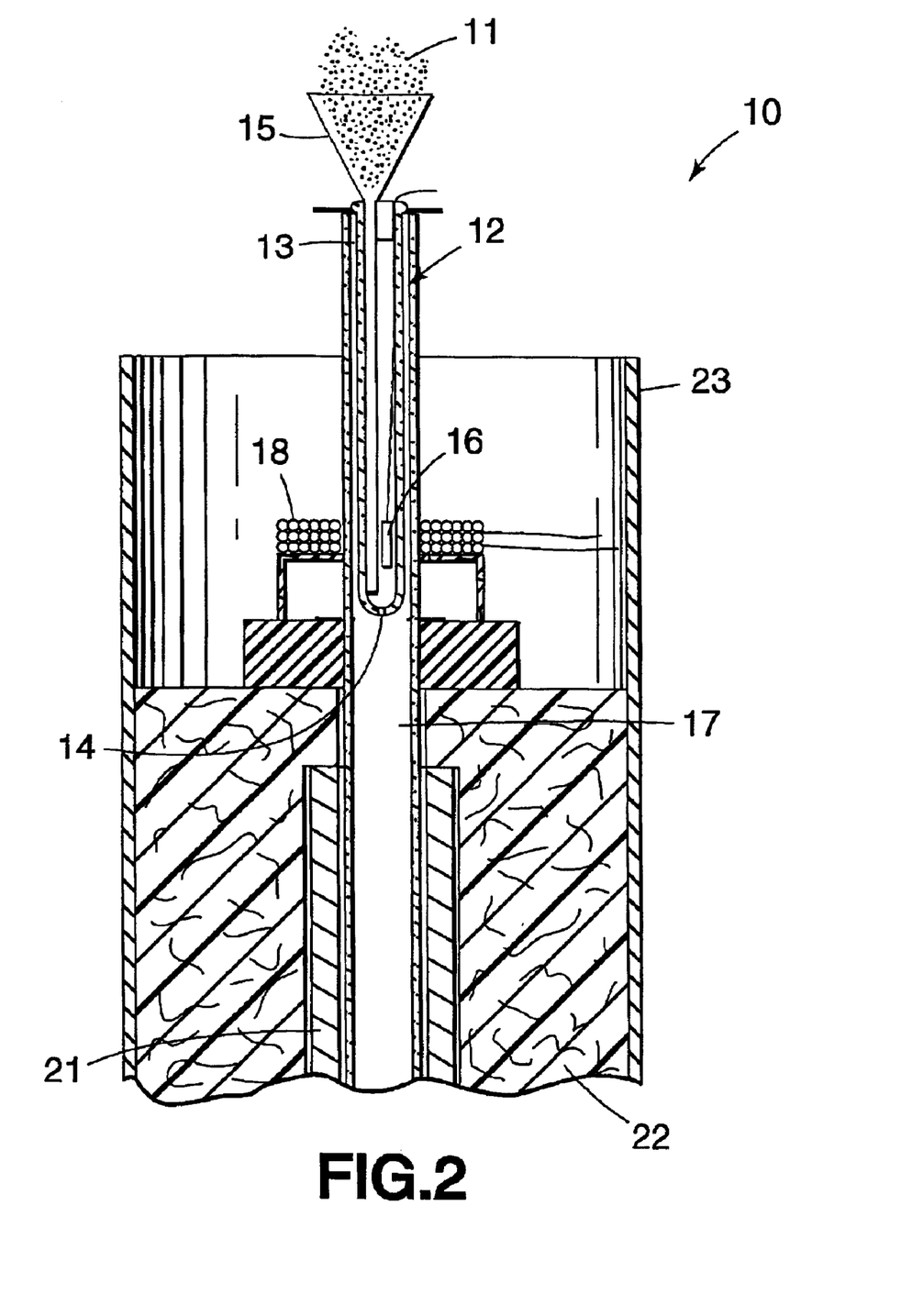
FIG. 2 is an enlarged cross-sectional view of the feed mechanism of the apparatus shown in FIG. 1.

An apparatus was set up as in FIG. 2, with the omission of heating element 21, insulation 22, and shell 23. A tube having an inner diameter of about 7.6 cm (3 in.) and a length of about 61 cm (24 in.) was substituted for the quartz drop tube. A clamp supported the feed tube, located at its upper end. Coal slag feedstock, about 0.32 mm to 0.4 mm in size, was fed into the funnel and was allowed to fall to the lower portion of the drop tube. The coil was powered such that the magnet rapped the inner wall of the feed tube once per second at a magnetic torque of roughly 0.001 Nm and a pulse width of about 10 msec.

A sheet of paper 21.6 cm wide and 27.9 cm long, marked with concentric circles from 1 cm to 10 cm diameter in 1 cm increments, was sprayed for about one second with Super 77™ Spray Adhesive, available from 3M Company, at a distance of about 30 cm with the spray directed to the center of the circular pattern. The paper was centered about 6 mm (0.25 in.) beneath the drop tube. Within no more than 60 seconds after spraying the adhesive, power was supplied to the coil as described above and the magnet began rapping the feed tube. After 45 seconds, the power was turned off and the paper was removed from beneath the drop tube. Evaluation by visual inspection showed that 86% of the 154 coal slag particles adhering to the paper fell within the 3 cm circle on the paper.

Example 4

Figure 3:
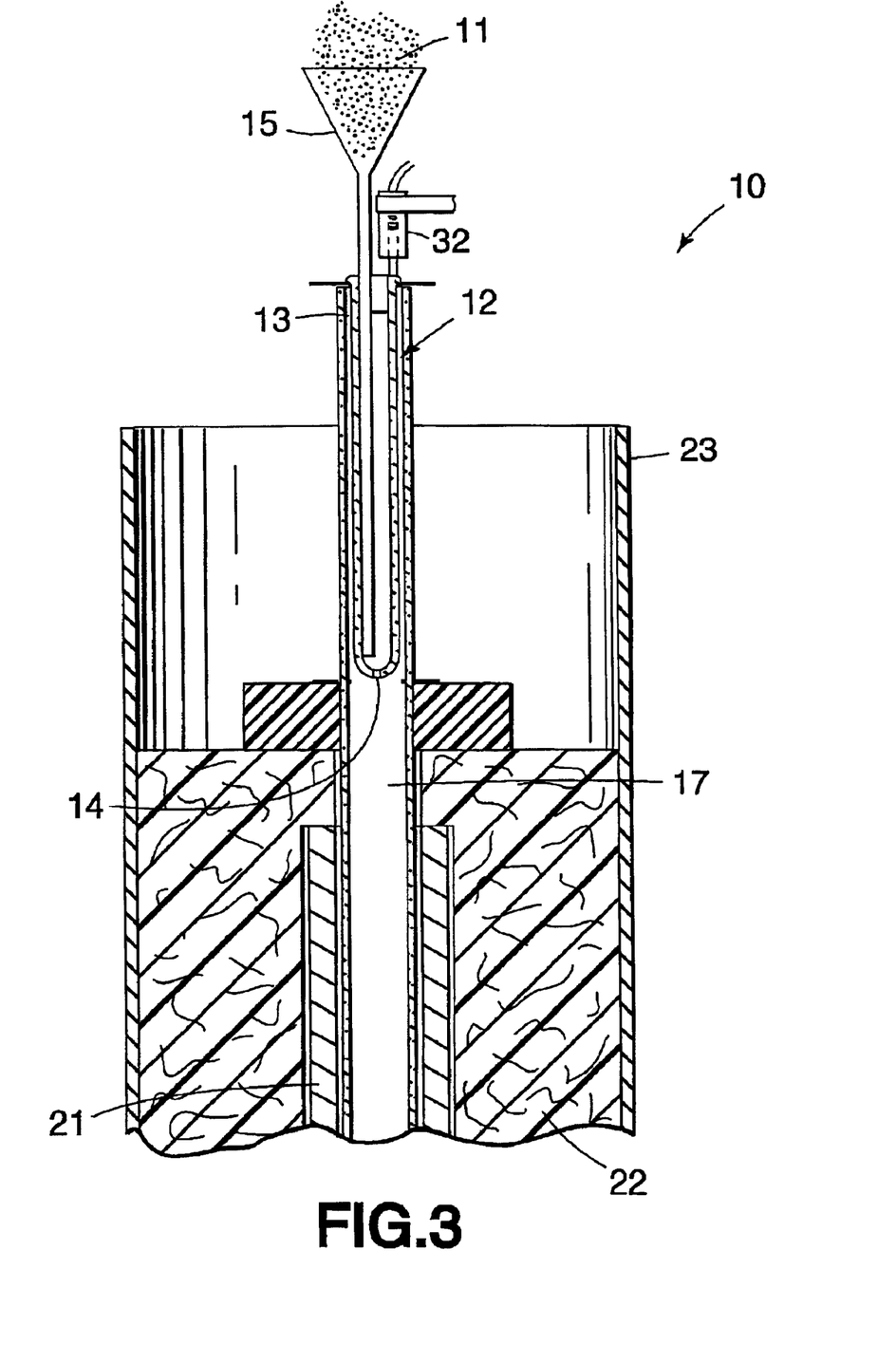
FIG. 3 is a cross-sectional view of an alternative feed mechanism useful with the apparatus of the invention.

An apparatus was set up as in FIG. 3, with the omission of heating element 21, insulation 22, and shell 23, and the solenoid being oriented at about a 45° downward angle to the rim of the feed tube with the solenoid slug abutting the feed tube rim. The solenoid used was about 1.2×1.2 cm wide×2.5 cm long with a 6 VDC, 38 ohm coil, and a 4.8 mm diameter×27 mm long steel slug. The slug was fitted on its inside end with a 6-turn steel spring having an average coil diameter of 3 mm and a length of about 6 mm, wound from about 0.25 mm diameter highcarbon steel music wire. The solenoid was connected to a 12 V pulse generator and was driven with 10 msec pulses at a rate of about 9 pulses per second.

Coal slag feedstock, about 0.32 mm to 0.4 mm in size, was fed into the funnel and was allowed to fall to the lower portion of the drop tube. Power was supplied to the solenoid as described above to effect rapping of the feed tube. The feed rate of the coal slag feedstock was determined to be about 1 mg/sec.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A process for spherulizing irregularly shaped particles of coal fly ash or coal slag comprising the steps of:
   (a) delivering a feedstock of irregularly shaped particles of coal fly ash or coal slag to a drop tube having an upper portion, a central portion, and a lower portion;
   (b) dropping the irregularly shaped particles into said upper portion of said drop tube in a manner such that the irregularly shaped particles flow in a substantially vertical downward path through said drop tube as individualized particles;
   (c) heating the irregularly shaped particles to a sufficient temperature by providing heat to said central portion of said drop tube to cause at least the outer surface of the irregularly shaped particles to melt such that a majority of the irregularly shaped particles become spheroidal particles due to surface tension at the outer surface; and
   (d) allowing the spheroidal particles to cool within said lower portion of said drop tube; and
   (e) crushing said spheroidal particles.

2. The process of claim 1 wherein the step of delivering comprises delivering said feedstock of irregularly shaped particles having a diameter of 0.001 to 10 mm.

3. The process of claim 2 wherein the step of delivering comprises delivering said feedstock of irregularly shaped particles having a diameter of 0.1 to 1 mm.

4. The process of claim 1 wherein the heating step comprises heating said central portion of the drop tube to a temperature of 1000° C. to 1700° C.

5. The process of claim 1 wherein the step of heating and allowing said spheroidal particles to cool comprises generating spheroidal particles having a hardness of 478 HV to 551 HV.

6. The process of claim 5 wherein the hardness of the spheroidal particles allows the spheroidal particles to be used in a procedure requiring small, hardened, spheroidal material.

7. The process of claim 6 wherein the procedure is shot peening.

8. The process of claim 6 wherein the procedure is polishing.

9. The process of claim 6 wherein the procedure is sand blasting.

10. The process of claim 6 wherein the procedure is filtering.

11. The process of claim 1 wherein said crushed spheroidal particles are suitable for use as roofing granules.

12. The process of claim 1 wherein said crushed spheroidal particles are suitable for use as an abrasive.

13. The process of claim 1 wherein the step of heating and allowing said spheroidal particles to cool comprises generating spheroidal particles wherein at least 90% of the particles are substantially spheroidal.

14. The process of claim 13 wherein 30% or less of said spheroidal particles are in the form of a duplex.

15. The process of claim 14 wherein 70% or more of the duplexes are dissociated upon handling.

16. The process of claim 1 wherein the steps of delivering, dropping, and heating occur in a drop tube that is of equal width at the upper portion, the central portion, and the lower portion.

17. The process of claim 1 wherein the step of delivering said feedstock of irregularly shaped particles into the drop tube comprises delivering said feedstock using a vibrating device.

18. The process of claim 1 wherein the step of delivering comprises the steps of:
   (a) feeding irregularly shaped particles to a feed tube oriented substantially vertically and having a substantially closed lower terminal portion with a discharge port substantially centered on the vertical axis of said feed tube; and
   (b) intermittently rapping said feed tube to cause said particles to discharge from said feed tube in a substantially vertical downward path as individualized particles.

19. The process of claim 18 wherein intermittently rapping comprises rapping at a rate and energy sufficient to cause the particles to discharge continuously.

20. The process of claim 1 wherein heating said feedstock of coal fly ash or coal slag comprises heating said feedstock of coal fly ash or coal slag which comprise material that generate $H_2O$, $NO$, $NO_2$, $SO_3$, $CO_2$, or mixtures thereof.

21. A process for spherulizing and hollowing irregularly shaped particles of coal fly ash or coal slag comprising the steps of:
   (a) delivering a feedstock of irregularly shaped particles of coal slag or coal fly ash to a drop tube having an upper portion, a central portion, and a lower portion;
   (b) adding to the feedstock a material which on heating generates $H_2O$, $NO$, $NO_2$, $SO_3$, $CO_2$, or mixtures thereof;
   (c) dropping the irregularly shaped particles into said upper portion of the drop tube in a manner such that said particles flow in a substantially vertical downward path through the drop tube as individualized particles;
   (d) heating the irregularly shaped particles to a sufficient temperature by providing heat to the central portion of said drop tube to cause at least the outer surface of the irregularly shaped particles to melt such that a majority of the irregularly shaped particles become spheroidal particles due to surface tension at the outer surface;
   (e) forming hollow regions within the spheroidal particles by heating due to the presence of $H_2O$, $NO$, $NO_2$, $SO_3$, $CO_2$, or mixtures thereof; and
   (f) allowing the spheroidal particles to cool within the lower portion of the drop tube.

* * * * *